Feb. 20, 1940.  F. E. STRAUSS  2,191,329
INDICATING SYSTEM
Filed Dec. 1, 1937   2 Sheets-Sheet 1
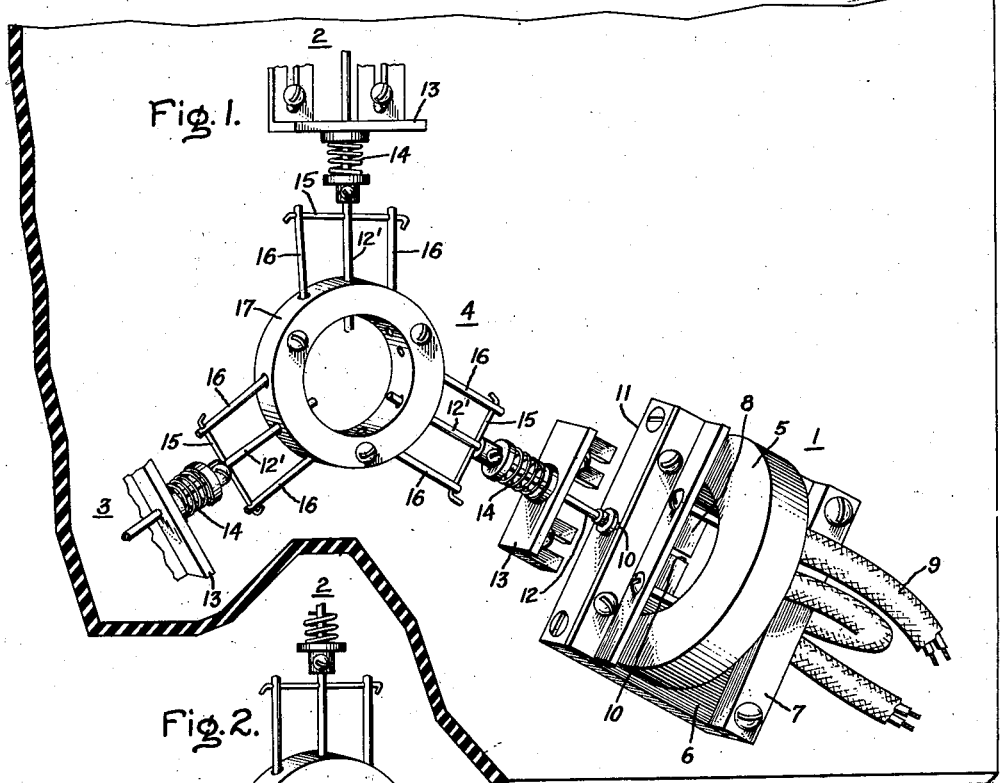
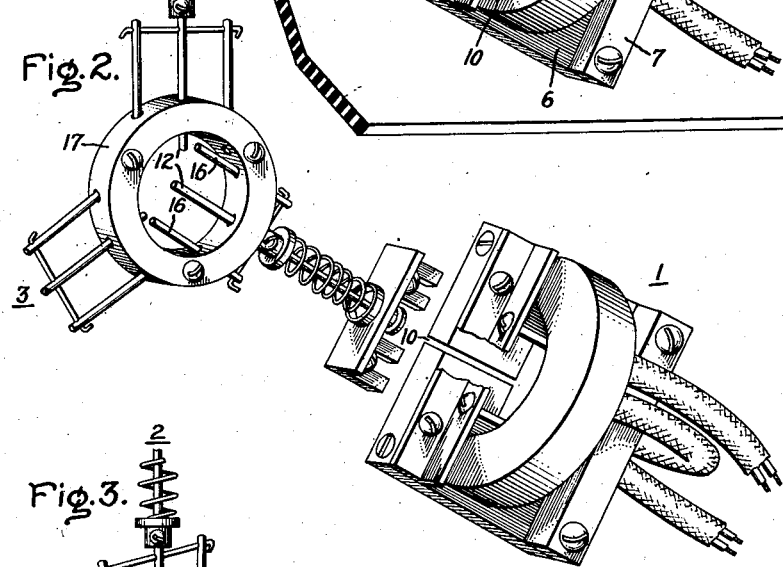
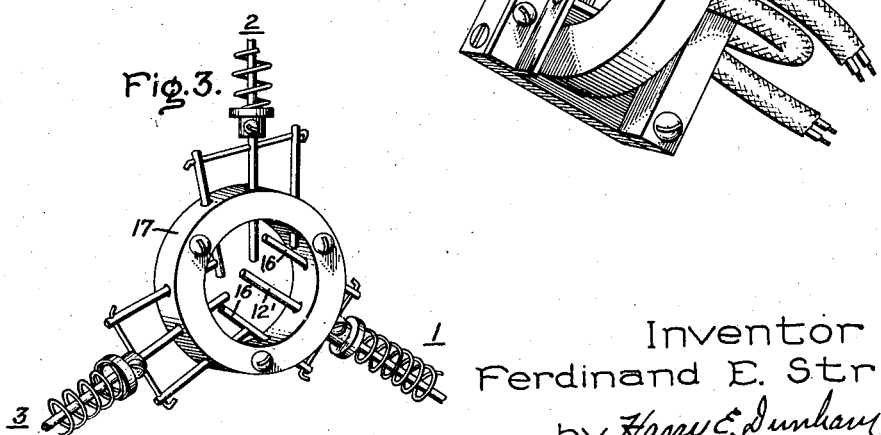
Inventor:
Ferdinand E. Strauss,
by Harry E. Dunham
His Attorney.

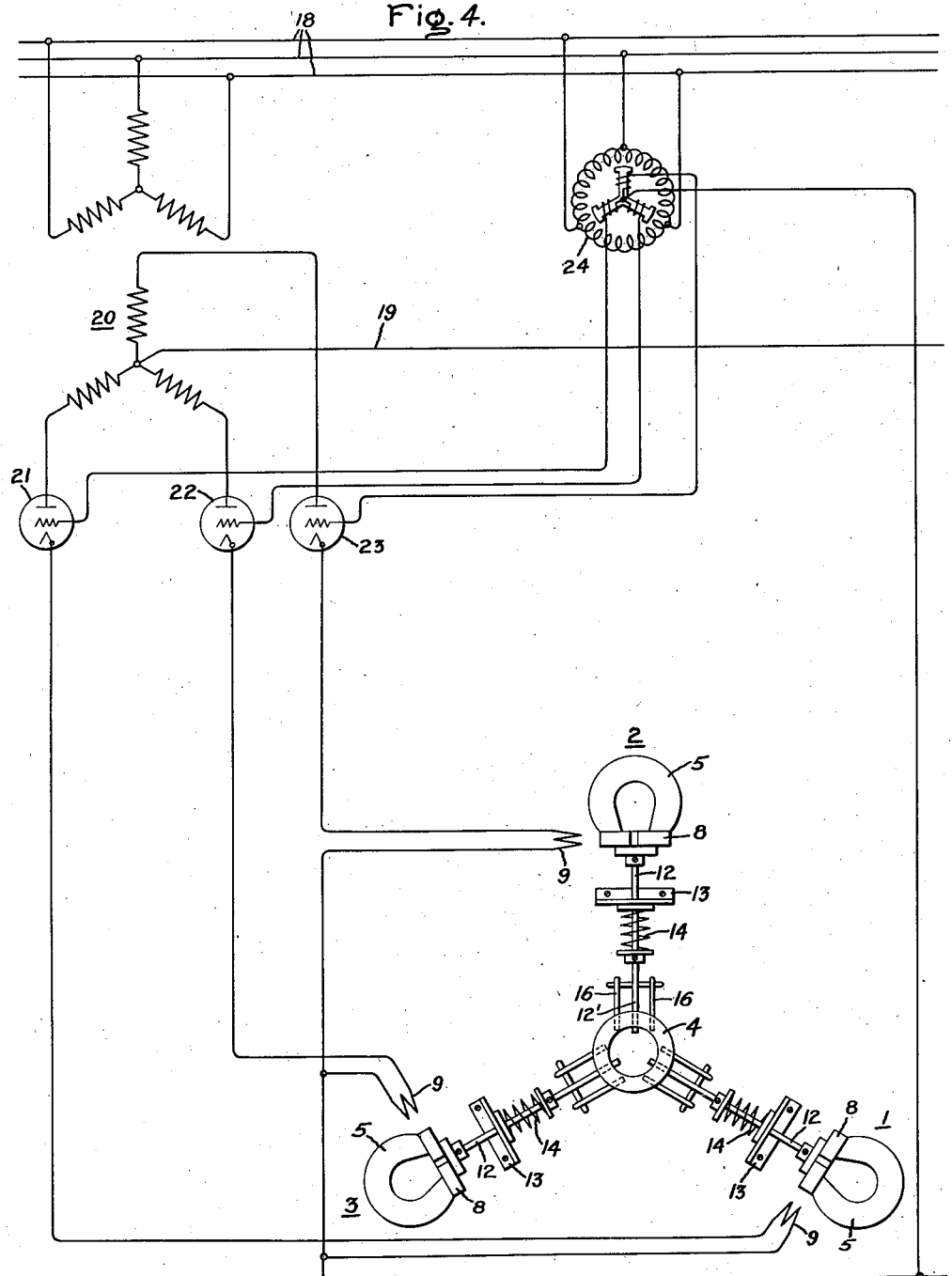

Patented Feb. 20, 1940

2,191,329

UNITED STATES PATENT OFFICE 2,191,329

INDICATING SYSTEM

Ferdinand E. Strauss, Schenectady, N. Y., assignor to General Electric Company, a corporation of New York Application December 1, 1937, Serial No. 177,494

7 Claims. (Cl. 177—311)

My invention relates to signaling and indicating systems, and more particularly to systems for indicating the occurrence of a plurality of events and the sequence of such events.

It is frequently desirable to provide means for indicating the occurrence of a plurality of events and for indicating the sequence in which such events have occurred. In electric circuits, particularly circuits employing electric valves, there has been evidenced a need for signaling and indicating systems for introducing which of a plurality of electric circuits have experienced electrical conditions of a predetermined character and there has been evidenced a further need for systems for indicating the sequence in which such predetermined electrical conditions have occurred in the various electric circuits. The need for such signaling and indicating systems is particularly great where the electrical conditions to be recorded or indicated occur in rapid succession. One field of application for signaling and indicating apparatus of this nature is in the electron tube art wherein it is desirable to signal or indicate the occurrence of arc-back in one or a plurality of the tubes in the system. Apparatus of this nature, in order to perform successfully the intended function, must be rapid and precise in operation and must be readily adaptable to electric circuits generally and must be capable of adaptation without necessitating material changes or alterations in the electric circuits to which the systems are applied.

One of the objects of my invention is to provide an electric signaling and indicating system to indicate the occurrence of predetermined events and to indicate the sequence in which such events have occurred.

Another object of my invention is to provide an improved electric signaling and indicating system to show in which circuits of a plurality of electric circuits electrical conditions of a predetermined character have occurred.

A further object of my invention is to provide an electro-magnetically actuated signaling and indicating system to indicate the electric circuits of a plurality of electric circuits in which electrical impulses of a predetermined character have occurred and to indicate the sequence in which the electrical impulses have occurred.

In accordance with the illustrated embodiment of my invention, a signaling and indicating system is provided to indicate the occurrence of predetermined events and for indicating the sequence in which such events have occurred. More specifically, means are provided for affording a permanent visual indication of the occurrence of certain events and the sequence in which such events have occurred, by employing an electromechanical indicating system. This system may comprise a plurality of individual electro-responsive devices which are arranged to respond to predetermined electrical conditions to release an armature to indicate the occurrence of such electrical condition in the particular electric circuit with which each electro-responsive device is associated. The indication of the sequence in which the conditions have occurred in the various electric circuits is accomplished by means of an indicating element which establishes the sequence in which the respective armatures have been actuated.

For a better understanding of my invention, together with other and further objects thereof, reference may be had to the following description taken in conjunction with the accompanying drawings and its scope will be pointed out in the appended claims.

Fig. 1 of the accompanying drawings is a view in perspective of one embodiment of my invention representing one of the electro-responsive actuating elements and the associated indicating element; Fig. 2 is a view in perspective of the embodiment of my invention illustrated in Fig. 1 showing the position of the armature and the indication afforded by the indicating element after the electro-responsive element has been actuated by the occurrence of a predetermined electrical condition; Fig. 3 is a detailed perspective view of the indicating element to illustrate the manner in which the sequence is indicated, and Fig. 4 illustrates an embodiment of my invention as applied to an electric valve translating circuit to indicate which of the various electric circuits have experienced electrical conditions of a predetermined character and for indicating the sequence in which said electrical conditions have occurred.

Referring now to Fig. 1 of the accompanying drawings in which my invention is represented as applied to an indicating system comprising three separate electro-responsive elements 1, 2 and 3 of which only portions of the elements 2 and 3 are shown in detail since the remaining operating portions may be assumed to be identical with the element 1 for purposes of this description. Corresponding parts are identified by the same reference numerals. The electro-responsive elements 1, 2 and 3 co-operate with the indicating element 4 to indicate the sequence in which the elements 1, 2 and 3 have been actuated. Each of the electro-responsive elements as shown in detail for element 1 comprises a permanent magnet 5, a magnetic path comprising magnetic members 6 and a magnetic member 7, and a parallel magnetic path comprising a magnetic member 8 having a high reluctance portion such as an air-gap 10. The permanent magnet 5 is arranged to establish a magnetic flux in the magnetic path 8 and across the air gap 10. A winding 9 is associated with the magnetic path comprising members 6 and 7, to control the magnetization of this path and the magnetization of member 8 and hence to control the magnetic flux appearing in the vicinity of the air-gap 10.

The winding 9 is arranged, relative to the magnetic path comprising magnetic members 6 and 7 and the permanent magnet 5, to provide a magnetomotive force which tends to increase the magnetic flux in the path 8 when the current in winding 9 is in the normal direction. Upon reversal of current in the winding 9, the magnetomotive force due to this winding will tend to reduce the flux in path 8 and to effect a reduction in the flux which crosses the air-gap 10. To obtain the desired variation in the flux appearing across the air-gap, the reluctances of the magnetic path comprising members 6 and 7 and path 8 may be arranged in any suitable manner. In the embodiment illustrated, the desired effect has been obtained by proportioning the reluctances of these magnetic paths so that there is appreciable flux in both of these paths due to the permanent magnet 5. Other unidirectional magnetizing means such as an electromagnet may be used in place of the permanent magnet 5. The magnetic path 8 is provided with a surface 11 against which an armature 12 abuts when in the attracted position. In the attracted position the armature 12 bridges the air-gap 10. The armature member 12, supported by a suitable relatively fixed guide member 13, is biased away from the surface 11 by means of a spring 14 and the guide member 13. Supported by the armature member 12 and carried by the armature member 12 and an arm 15 are two pins or prongs 16 which, acting in conjunction with an extending portion 12' of the armature 12, serve the purpose of indicating actuation of the electro-responsive element 1. The pins 16 are loosely attached to the armature 12 by means of the arm 15 so that the pins 16 may rock upon actuation to the position shown in Fig. 3.

The indicating element 4 may consist of an integral positioning or guiding frame 17 through which the various armatures 12 and associated indicating pins 16 pass to project into a center opening of the frame 17. The frame 17 provides a means for effecting integral association of the armature members 12 and serves to control the relative positions of the various armature members 12 in the released positions. The armature members 12 are arranged to lie in a plane and are arranged to move along axes which lie in this plane. The axes intersect at the center of the circular frame 17.

Referring now to Fig. 2 of the accompanying drawings, the positions of the armature 12 and the associated indicating pins 16 are shown after the armature 12 has been released from the attracted position shown in Fig. 1. This release may be effected by energization of the winding 9 to cause a reduction of the magnetization established by permanent magnet 5 in magnetic path 8. In the particular position represented in Fig. 2, the indicating system shows that the electro-responsive element 1 has been subjected to a predetermined electrical condition, effecting thereby release of the armature member 12 and establishment of an indication within the indicating frame 17. It further shows that the electro-responsive elements 2 and 3 have not been subjected to such an electrical condition, inasmuch as the respective armatures have not been released and no indicating pins associated with elements 2 or 3 are extending through the frame 17.

Fig. 3 of the drawings illustrates the position of the indicating device when the electro-responsive elements 1, 2 and 3 have experienced electrical impulses of a predetermined character in a sequence corresponding to the order named. That is, the electro-responsive element 1 was the first to experience the predetermined electrical condition and as a result thereof the extension 12' and the indicating pins 16 have extended through the frame 17 to show three indicating points within the opening. Furthermore, the indicating device shows that the electro-responsive element 2 was the second to experience this electrical condition since only two indicating pins have extended into the opening of the frame 17. The right hand pin of the armature construction associated with electro-responsive element 2 has been prevented from extending into the opening an appreciable distance by virtue of the pin 16 of electro-responsive element 1. Lastly, the indicating element shows that the electro-responsive element 3 was the third to experience the predetermined electrical condition since only the extension 12' of armature member 12 extends an appreciable distance into the opening of frame 17.

A further feature to be noted in regard to the rapid manner in which the indicating device operates is the relative positions of the indicating pins 16 of the respective armatures. It will be understood that pins 16 of the armature member associated with electro-responsive element 1 are required to travel only a very short distance in order to obstruct corresponding pins of the other armature members. By this arrangement the indicating system is adapted to provide a quick responding indication of the sequence of operation of the various armature members 12.

Although my invention has been shown as applied to an electro-responsive system for indicating the sequence in which three elements have experienced certain events, it should be understood that my invention in its broader aspects may be applied to indicate the occurrence of events and the sequence in which such events have occurred for systems involving a lesser or greater number of elements.

Referring now to Fig. 4 of the accompanying drawings, my invention is there diagrammatically illustrated as applied to an electric valve system for transmitting energy between a three phase alternating current circuit 18 and a direct current load circuit 19 by means of a transformer 20 and electric valves 21, 22 and 23 which are connected, for purposes of illustration, in a well-known manner. In the indicating system, elements have been given reference numerals corresponding to those used in Figs. 1, 2 and 3. The electric valves may be rendered conductive by means of any conventional phase shifting arrangement, such as a rotary phase shifting device 24. In this embodiment of my invention, the winding 9 of the various electro-responsive elements 1, 2 and 3 may be energized in response to the current conducted by the various electric valves and are shown as being connected in series with the electric valves. In the diagrammatic representation of the indicating system as shown in Fig. 4, the respective armature members 12 of the various electro-responsive elements 1, 2 and 3 are shown in the attracted or unreleased position.

The electro-responsive elements 1, 2 and 3 and the associated indicating element 4 and armatures 12 are inherently capable of responding to events, such as electrical transients, which occur in rapid succession. By virtue of the construction of the electro-responsive devices and the associated armatures 12, it is possible to obtain very rapid actuation of the indicating device 4. It will be noted that the moving elements or armatures 12 are of rigid construction but have comparatively little inertia. The springs 14 exert considerable force upon the armature members to move them rapidly to the indicating position. The electro-responsive elements 1, 2 and 3 are arranged so that a considerable magnetic flux continually passes through the magnetic path 8 of each of the devices. The armatures 12 are released by small reductions in the magnetic flux within this magnetic path 8 occasioned by the reversal of current in the magnetizing windings 9. It should be understood that upon such reversal of current in the windings 9 the flux within the magnetic path 8 is not subject to a reversal but is merely reduced in magnitude. The forces exerted upon the armature members 12 by the springs 14 are chosen so that slight reductions in magnetic field value within the air-gap 10 or in the vicinity thereof effect a precise and rapid release of the armature members 12.

The operation of the embodiment of my invention as diagrammatically illustrated in Fig. 4 may be best explained by first considering the electric valve translating circuit during normal operation. In the manner well understood by those skilled in the art, the electric valves 21, 22 and 23 will be rendered conductive in a predetermined sequence. The windings 9 of the various electro-responsive elements 1, 2 and 3 are associated with the magnetic paths comprising magnetic members 6 and 7 as shown in Figs. 1, 2 and 3 in the manner described above to assist the effect produced by the permanent magnet 5. Therefore, the respective armature members 12 will be retained in the attracted position shown in Fig. 1 described above. If it be assumed that the current in one of the electric valves reverses, such as for example the current in electric valve 21 reverses due to an arc-back condition, the effect of this reverse current on the electro-responsive element 1, by virtue of the winding 9, will be to oppose the flux produced by the permanent magnet 5 in the path 8, reducing the magnetic flux crossing the air-gap 10 and resulting in the release of the armature 12. In this manner an indication will be afforded that reverse current condition has existed in the electric valve 1 or the associated circuit. Similarly, if electric valves 22 or 23 experience a like condition, the associated electro-responsive elements 2 and 3 will respond to show that such a condition has existed. It should be noted further that even though the arc-back conditions occur in rapid succession the indicating system will respond precisely to afford an indication of the sequence in which the various reverse conditions have occurred.

While I have shown and described my invention as applied to a particular system of connections and as embodying various devices diagrammatically shown, it will be obvious to those skilled in the art that changes and modifications may be made without departing from my invention, and I therefore, aim in the appended claims to cover all such changes and modifications as fall within the true spirit and scope of my invention.

What I claim as new and desire to secure by Letters Patent of the United States is:

1. In combination, a plurality of electric circuits, a plurality of electro-responsive devices each associated with a different one of said circuits and each comprising an armature member arranged to be retained in one posiiton and to be released to a second position, an actuating element for moving said armature member to said second position, a unidirectional magnetizing element for maintaining said armature member in said one position and an associated electro-magnet for cooperating with said actuating element to effect release of said armature to said second position, the armature members lying in a plane and being arranged to move along axes lying in said plane and tending to assume certain space in common when released to the second positions whereby the members first released interfere with later released members, and means associated with each of said armature members for controlling the relative positions of said armature members in said second positions for indicating the sequence in which said armature members have been released to said second position.

2. In an indicating system for indicating the occurrence of events of a predetermined character and the sequence in which such events have occurred, a plurality of armature members each arranged to be maintained in one position prior to the occurrence of said predetermined event and arranged to be actuated to a second position upon the occurrence of such event, individual means associated with each of said armature members comprising a retaining element for maintaining the associated armature member in said one position and an actuating element to effect movement of said armature member to said second position, the armature members lying in a plane and being arranged to move from said one positions to said second positions along axes lying in said plane and tending to assume certain space in common when released to the second positions whereby the members first released interfere with later released members, and indicating means associated with each of said armature members for guiding said armature members and for controlling the relative positions of said armature members in said second positions to indicate the sequence in which said events have occurred.

3. In an indicating system for indicating the occurrence of events of a predetermined character and the sequence in which such events have occurred, a plurality of armature members each arranged to be maintained in one position prior to the occurrence of an event and arranged to be actuated to a second position upon the occurrence of such event, individual means associated with each of said armature members comprising a permanent magnet for maintaining the armature member in said one position and an electro-responsive element for opposing said permanent magnet upon occurrence of said predetermined event to effect movement of said armature member to said second position, the armature members lying in a plane and being arranged to move along intersecting axes lying in said plane and tending to assume certain space in common when released to the second positions whereby the members first released interfere with later released members, and a frame associated with said armature members for guiding said armature members and for controlling the relative positions of said armature members in said second positions to indicate the sequence in which said armature members have been moved to said second positions.

4. In an indicating system for indicating the occurrence of events of a predetermined character and the sequence in which said events have occurred, a plurality of armature members each having a plurality of indicating pins carried by the associated armature member and arranged to be maintained in one position prior to the occurrence of an event and arranged to be moved by a spring element to a second position upon the occurrence of such event, the armature members lying in a plane and being arranged to move along intersecting axes lying in said plane and tending to assume certain space in common when released to the second positions whereby the members first released interfere with later released members, individual means associated with each of said armature members comprising a permanent magnet for maintaining the armature member in said one position prior to the occurrence of such predetermined event and an electro-responsive element for opposing the effect of said permanent magnet upon occurrence of said predetermined event to effect release of said armature member, and an indicating element including a frame associated with the indicating pins of said armature members for guiding said indicating pins and for controlling the relative positions of said indicating pins to indicate the sequence in which said armature members have been moved to said second positions.

5. In combination, a plurality of electric circuits, a plurality of electro-responsive devices each associated with a different one of said circuits and each comprising an armature member arranged to be retained in one position and to be released to a second position and means for moving said armature member to said second position upon the occurrence of a pretermined electrical condition of the associated one of the electric circuits, the armature members lying in a plane and being arranged to move along axes lying in said plane and tending to assume certain space in common when released to the second positions whereby the members first released interfere with later released members, and means for controlling the relative positions of said armature members in said second positions for indicating the sequence in which said armature members have moved to said second positions.

6. In a system for indicating the occurrence of events and the sequence in which such events occur, a plurality of movable members lying substantially in a plane and each having an initial position and a fully released position towards which the members proceed and each having a loosely mounted indicating member, the members being arranged to tend to assume certain space in common when released to the fully released positions whereby the members first released interfere with the later released members, and means for guiding the movement and the relative positions of the indicating members in the fully released position to afford an indication of the sequence in which said events have occurred.

7. In a system for indicating the occurrence of events and the sequence in which such events occur, a plurality of movable members lying substantially in a plane and each having an initial position and a fully released position towards which the members proceed and each having an indicating member, the indicating members tending to assume certain space in common and converging towards a common center when released to their extreme positions whereby the indicating members first released interfere with later released members, means tending to maintain said movable members in the initial positions, and means for releasing said movable members.

FERDINAND E. STRAUSS.